United States Patent [19] [11] 4,085,071
Resnick et al. [45] Apr. 18, 1978

[54] ION EXCHANGE POLYMER FILM, CONSISTING OF FLUORINATED POLYMER WITH N-MONOSUBSTITUTED SULFONAMIDO GROUPS METHOD AND APPARATUS FOR ELECTROLYSIS OF ALKALI OR ALKALINE EARTH METAL HALIDE

[75] Inventors: Paul Raphael Resnick, Wilmington, Del.; Walther Gustav Grot, Chadds Ford, Pa.

[73] Assignee: E. I. DuPont de Nemours and Company, Wilmington, Del.

[21] Appl. No.: 623,920

[22] Filed: Oct. 20, 1975

Related U.S. Application Data

[63] Continuation-in-part of Ser. No. 406,361, Oct. 15, 1973, abandoned.

[51] Int. Cl.$^2$ .............................................. C09D 3/78
[52] U.S. Cl. ................................... 260/22 R; 204/98; 204/100; 204/129; 204/252; 260/79.3 M
[58] Field of Search ................... 204/296; 260/2.2 R, 260/79.3 M; 526/245, 248

[56] References Cited

U.S. PATENT DOCUMENTS

| | | | |
|---|---|---|---|
| 3,240,723 | 3/1966 | Friedlander | 260/2.2 R |
| 3,647,086 | 3/1972 | Mizutani | 260/2.2 R |
| 3,784,399 | 1/1974 | Grot | 260/96 R |
| 3,849,243 | 11/1974 | Grot | 260/2.2 R |
| 3,909,378 | 9/1975 | Walmsley | 204/296 |

Primary Examiner—Joseph L. Schofer
Assistant Examiner—Peter F. Kulkosky

[57] ABSTRACT

An ion exchange film comprises a fluorine-containing polymer with (1) ion exchange sites present in a first layer as N-monosubstituted sulfonamido groups or salt thereof formed through reaction of a primary amine and (2) ion exchange sites present in a second layer of the film other than as said N-monosubstituted group or salt thereof. The film is suitable as a separator in a cell for electrolysis of an alkali or alkaline earth metal halide particularly sodium chloride in producing hydrogen, chlorine and caustic soda. In making concentrated caustic soda, high current efficiencies have been obtained in operation of the cell.

19 Claims, No Drawings

ION EXCHANGE POLYMER FILM, CONSISTING OF FLUORINATED POLYMER WITH N-MONOSUBSTITUTED SULFONAMIDO GROUPS METHOD AND APPARATUS FOR ELECTROLYSIS OF ALKALI OR ALKALINE EARTH METAL HALIDE

RELATED APPLICATION

The present application is a continuation-in- part of copending application Ser. No. 406,361 filed Oct. 15, 1973 and now abandoned.

BACKGROUND OF THE INVENTION

The present invention relates to ion exchange polymer films and to processes and apparatus using these films.

Fluorinated ion exchange polymers are known in the prior art formed from an intermediate or precursor polymer which contains pendant side chains with sulfonyl fluoride groups. These groups are converted to ion exchange sites such as by hydrolysis with an alkaline material or by treatment with ammonia. An example of such prior art teaching is disclosed in U.S. Pat. No. 3,282,875 to Connolly et al.

Treating cation exchange polymers to modify relative cationic transport is disclosed in U.S. Pat. No. 3,647,086 to Mizutani et al. for preparation of an ion exchange membrane in which permeation selection of different classes of cations is improved. As set forth in this patent, a cation exchange polymer of a high molecular weight polymer contains chemically bonded acid amide groups. These groups are present at the substantial surface portion to satisfy the equation:

$$A/(A + B) \times 100 = 15 - 10^{-5}\%$$

wherein (per gram of dry membrane) A is the number of acid amide bonds and B is the number of cation exchange groups. The reaction is controlled such that the formation of the acid amide bonds takes place only at the surface or as set forth in the patent at the "substantial surface".

An important utility for ion exchange polymers is in the electrolysis of an aqueous solution of an alkali or alkaline earth metal halide to produce hydrogen and the corresponding halogen and metal hydroxide. By far the most important application in this field is the chloralkali industry using aqueous sodium chloride as a source material.

A need has developed in the chlor-alkali industry for the use of improved ion exchange materials which can replace existing separators in an electrolytic cell which have been used for decades without substantial improvement in design.

In the environment of a chlor-alkali cell, the ion exchange polymer must be able to withstand a hostile environment such as exposure to a highly alkaline pH as well as exposure to chlorine and concentrated brine at temperatures approaching 100° C. Generally, hydrocarbon ion exchange membranes are totally unsatisfactory for this application since the membrane cannot withstand this environment.

For commercial usage in the chlor-alkali industry, a separator formed from an ion exchange polymer must go beyond the ability to be operable for prolonged time periods in the production of chlorine and caustic soda. An important criteria for the polymer is the ability to operate an electrolytic cell with high current efficiency and with low levels of impurities resulting from undesirable by-products. Also, an improvement in current efficiency can translate into pronounced savings in the cost of production of each unit of chlorine and caustic, e.g. a reduction in power consumption. The operation of the electrolytic cell with the proper separator to produce concentrated caustic soda is highly desirable to reduce the expense of production.

SUMMARY OF THE INVENTION

The present invention is directed to a polymeric film useful for ion exchange and the application of such film as a separator in the electrolysis of an aqueous solution of an alkali or alkaline earth metal halide and an electrolytic cell using such separator. The film comprises a fluorine-containing polymer containing pendant side chains with sulfonyl groups attached to carbon atoms having at least one fluorine atom connected thereto, a first layer of said film containing sulfonyl groups as ion exchange sites as N-monosubstituted sulfonamido groups or salt thereof formed through reaction of a primary amine and a second layer of said film containing sulfonyl groups as ion exchange sites other than as said N-monosubstituted sulfonamido groups or salt thereof.

The use of the film as a separator in an electrolytic cell is particularly suited for the electrolysis of aqueous sodium chloride, i.e. brine, since concentrated caustic soda has been made at high current efficiencies.

DETAILED DESCRIPTION OF THE INVENTION

The film of the present invention comprises a fluorine-containing polymer with ion exchange sites in different forms in two separate layers of the film. In a first layer and preferably extending from a first surface of the film, the ion exchange sites are formed through a reaction of a primary amine with a precursor or intermediate polymer containing pendant sulfonyl groups present as —SO$_2$X with X defining chlorine or fluorine, preferably fluorine. In a second layer of the film preferably extending from a second surface and opposite from the first surface of the film, the ion exchange sites are present other than as the N-monosubstituted sulfonamido groups or salt thereof.

Although the film can be employed for ion exchange purposes generally, the film is particularly suitable as a separator in an electrolytic cell for electrolysis of an aqueous solution of an alkali or alkaline earth metal halide. For the purposes of illustration in electrolysis of aqueous sodium chloride in a chloralkali cell, the ion exchange polymer film as a separator between anode and cathode compartments has a single surface or layer converted to the N-monosubstituted sulfonamido form or salt thereof. The N-monosubstituted sulfonamido layer converted to the salt form faces the cathode portion of the cell in production of caustic soda (caustic) and hydrogen. The results and stability of the film are drastically different with reversal of this film. The conversion to the salt form by conventional techniques may take place before or after insertion of the film in the cell. This film or membrane serves to minimize anion transport of hydroxyl ions and acts as a barrier for such transport. Also, the formation of a layer, rather than total conversion, has been found to reduce the overall electrical resistance of the polymer leading to highly desirable results from the standpoint of electrical power consumption.

With use of the film of the present invention in a chlor-alkali cell, high current efficiencies have been obtained in producing concentrated caustic soda. Electrical efficiencies in excess of 90% have been achieved in producing concentrated caustic soda, i.e., above 8 N or 10 N. In comparison with other polymer ion exchange films, a substantial increase in electrical efficiency has been obtained in making a similar concentration of concentrated caustic soda.

An important criterion in a chlor-alkali cell is the amount of power required for each unit of chlorine and caustic. It is considered the films permit a proper combination of operating conditions to realize a reduction in power. Since the power requirement (which may be expressed in watt-hours) is a function of both cell voltage and current efficiency, low cell voltages are desirable and necessary. However, a film without a high current efficiency cannot operate effectively from a commercial standpoint even with extremely low cell voltages. Additionally, a polymer with an inherent high current efficiency allows a proper combination of parameters as in fabrication into the film and/or operation of the electrolytic cell to realize the potential theoretical reduction in power. Illustratively, the polymer can be fabricated at a lower equivalent weight which may result in some loss of current efficiency which is more than compensated by a reduction in voltage. The cost of electrical power is a major expense of production. Illustratively, in a chlor-alkali plant producing 1000 tons per day of chlorine, a saving in electrical power for only a 1% increase in efficiency (and an equal voltage) is significant.

An increase in current efficiency means the overall impurity level will be reduced in the products withdrawn from the electrolytic cell. If the chlorine generated in the anode compartment contains unduly high impurity levels, addition of acid is generally necessary. As a practical matter, acid addition is highly undesirable.

Since chlor-alkali cells have operated at high current efficiencies at concentrated caustic soda concentrations, it is feasible from an economic standpoint to produce the caustic soda removed from the cell at a concentration of at least about 8 N. More preferably, the caustic soda will be at a concentration of at least about 10 N and most preferably 15 N. As a practical matter, the caustic concentration will generally be less than about 18 N.

The ion exchange polymers used herein possess pendant side chains containing sulfonyl groups attached to carbon atoms having at least one fluorine atom connected thereto with the pendant chains present as N-monosubstituted sulfonamido groups. The polymers are prepared from monomers which are fluorinated or fluorine substituted vinyl compounds. The polymers are made from at least two monomers with at least one of the monomers coming from each of the two groups described below. The first group includes fluorinated vinyl compounds such as vinyl fluoride, hexafluoropropylene, vinylidene fluoride, trifluoroethylene, chlorotrifluoroethylene, perfluoro (alkyl vinyl ether), tetrafluoroethylene and mixtures thereof. In the case of use of copolymers in electrolysis of brine, the precursor vinyl monomer desirably will not contain hydrogen.

The second group includes sulfonyl-containing monomers containing the precursor $-SO_2F$ or $-SO_2Cl$. One example of such a comonomer is $CF_2=CFSO_2F$.

Additional examples can be represented by the general formula $CF_2=CFR_fSO_2F$ wherein $R_f$ is a bifunctional perfluorinated radical comprising 2 to 8 carbon atoms. The particular chemical content or structure of the radical linking the sulfonyl group to the copolymer chain is not critical but such must have a fluorine atom attached to the carbon atom to which is attached the sulfonyl group. If the sulfonyl group is attached directly to the chain, the carbon in the chain to which it is attached must have a fluorine atom attached to it. Other atoms connected to this carbon can include fluorine, chlorine, or hydrogen although generally hydrogen will be excluded in use of the copolymer for ion exchange in a chlor-alkali cell. The $R_f$ radical of the formula above can be either branched or unbranched, straight-chained and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are $CF_2=CFOCF_2CF_2SO_2F$,

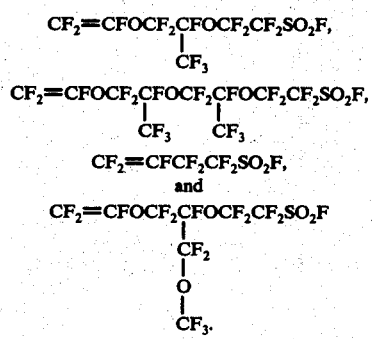

The most preferred sulfonyl fluoride containing comonomer is perfluoro(3,6-dioxa-4-methyl-7-octenesulfonyl fluoride),

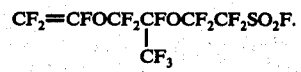

The sulfonyl-containing monomers are disclosed in such references as U.S. Pat. No. 3,282,875 to Connolly et al., U.S. Pat. No. 3,041,317 to Gibbs et al., and U.S. Pat. No. 3,718,627 to Grot and U.S. Pat. No. 3,560,568 to Resnick.

The preferred copolymers utilized in the film are perfluorocarbon although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably 25 to 50 percent by weight of the latter.

The copolymer used in the present invention is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, to H. H. Gibbs et al., that is by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0°-200° C. and at pressures in the range 1-200, or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like.

Aqueous techniques for preparing the copolymer used in this invention include contacting the monomers with an aqueous medium containing a free-radical initiator to obtain a slurry of polymer particles in non-water-wet or granular form, as disclosed in U.S. Pat. No. 2,393,967 to Brubaker or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 to Berry and U.S. Pat. No. 2,593,583 to Lontz.

Upon formation of the intermediate polymer, the pendant sulfonyl groups are present as —$SO_2X$ with X defining fluorine or chlorine, preferably fluorine. It is a requirement in both the intermediate and final fluorinated polymers disclosed herein that the sulfonyl groups are attached to carbon atoms having at least one fluorine atom connected thereto. These carbon atoms serve to link the sulfonyl group to the copolymer chain or alternatively, the carbon atoms to form a portion of the backbone chain in the copolymer. After formation of the intermediate polymer as a film, the sulfonyl groups in a first layer of the polymer are converted to N-monosubstituted sulfonamido groups or salt thereof through reaction of a primary amine. The sulfonyl groups in a second layer of the polymer are converted to ion exchange sites present as other than the N-monosubstituted sulfonamido groups or salt thereof.

The N-monosubstituted sulfonamido groups and salt thereof function as ion exchange sites. If these groups are unstable in a specific application, e.g. in a separator in a chlor-alkali cell, reaction and conversion of the group can occur to a stable ion exchange site.

Suitable N-monosubstituted sulfonamido groups include the primary amines disclosed in U.S. Pat. No. 3,647,086 to Mizutani et al. Although this prior art patent discloses reaction of both primary and secondary amines with the ion exchange polymer, the reacted amines are not required to function as ion exchange groups in direct contrast to the disclosed groups in the polymers of the present application.

The amines useful in the invention are primary amines of the type disclosed in U.S. Pat. No. 3,647,086 which disclosure is incorporated by reference herein. Therefore, these amines are of the formula

wherein R is alkyl, haloalkyl, alkyl substituted by either hydroxy, amino, carboxy, alkoxy, phosphonic acid, sulfonic acid, nitro, nitrile, carbamoyl, sulfonic acid amide or phosphonic acid amide, aryl, aryl substituted by hydroxy, amino, carboxy, phosphonic acid, alkoxy, sulfonic acid, nitro, nitrile, carbamoyl, sulfonic acid amide, carbamoyl or phosphonic acid amide, a heterocyclic group or aralkyl. In addition to the amides listed above, the corresponding esters are likewise suitable. Illustrative of suitable R groups are straight and branch chained alkyls, benzyl and

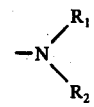

wherein both $R_1$ and $R_2$ independently of the other can represent alkyl, aryl, aralkyl or hydrogen. Illustratively, both $R_1$ and $R_2$ may include alkyl. Suitable amines include those of di-, tri and poly-functional types as di-, tri- and poly-amines. Generally, amines containing alkyl groups have been found most satisfactory such as methyl amine and diamines of the type $NH_2(CH_2)_pNH_2$ wherein $p$ is 2 to 10. The length of the chain will generally be limited to an alkyl group of 1 to 10 carbon atoms or 2 to 10 carbon atoms for alkylene in the case of diamines. Preferably the chain will not be more than 4 carbon atoms.

It is within the scope of this invention to include the salts of the N-monosubstituted sulfoamido groups. Suitable salts include those with alkaline earth and alkali metal cations. Preferred metals include sodium and potassium.

To obtain the conversion of the intermediate pendant sulfonyl group, —$SO_2X$ with X previously defined, the precursor or intermediate polymer can be treated with the amine in either liquid or gaseous form.

Both reactive and inert carriers and solvents for the amine may be employed. The reactive carrier will compete with the amine in conversion of the pendant sulfonyl halide sites on the precursor polymer. A reactive carrier contains active hydrogen such as water. Primary alcohols are not considered suitable since they react rapidly with the intermediate pendant sulfonyl halide groups lowering the concentration of the desired ion exchange sites. The competitive reaction may also produce ion exchange sites in the fluorinated polymer disclosed herein since the sulfonyl halide is converted to —$SO_3^-$.

While outstanding advantages have been obtained with essentially complete conversion of the active sulfonyl halides in a polymer layer or surface to form the N-monosubstituted sulfonamido groups, it is within the scope of this disclosure to convert only a minimum of 40 to 50% or about a majority of these sulfonyl groups to this form. The remaining groups are desirably converted to other active ion exchange groups. For example, water employed as a carrier with the amine will promote a competing reaction with the sulfonyl halide.

Inert solvents may be desirably employed which contain no active hydrogen atoms and do not promote a competing reaction. Examples include dimethyl formamide, dimethyl sulfoxide, tetramethylene sulfone, hexamethyl phosphoramide, diglyme, acetonitrile and general classes of ethers and nitriles.

Pressure and temperature together with the carrier or solvent, if employed, will determine the efficiency and time of conversion of the sulfonyl groups and will tend to influence the degree of penetration of the amine into the polymer.

However, pressure and temperature are not considered critical in the framework of obtaining conversion of the pendant —$SO_2X$ groups but rather upon the rate of reaction and degree of penetration of the amine.

Illustratively, room temperature conversion has been found to be satisfactory for most amines. Pressure, below, at or above atmospheric, may be employed. With gaseous treatment, the proper combination of pressure and temperature will be employed to obtain the amine in the gaseous state. With gaseous treatment, an inert gas as a carrier may be employed.

For purposes of explanation in the reaction procedure, it is considered from physical observation after reaction with the amine that a sharp line of demarcation exists between converted sulfonyl halide groups and unconverted sulfonyl halide groups if the intermediate polymer does not or is not allowed to completely react. This occurrence is based upon staining the reacted polymer with a cationic active dye such as Sevron ® Red. In the present context, a sharp line of demarcation refers to observation of a stained boundary with a cationic active dye.

It is desirable that essentially all of the pendant sulfonyl groups with the amine treated layer react with the amine and convert to N-monosubstituted sulfonamido groups. In the present context "essentially completely conversion" or "essentially all groups present as N-monosubstituted sulfonamido groups" refers to a conversion of at least 90% of the original sulfonyl halide groups to the N-monosubstituted sulfonamide form. As employed in the present context, "complete conversion" or "all groups present as N-monosubstituted sulfonamido groups" refers to a conversion of at least 99% of the original sulfonyl halide groups to the N-monosubstituted sulfonamido form. Likewise, salt refers to the amine conversion percentages. All of the above conversions including the minimum of 40% also preferably refer to the composition of a layer at least 1 micron in depth. A minimum thickness of conversion is at least 200 angstroms.

In the treatment with amine, extremely short reaction times are employed which are of the order of minutes such as 3 to 15 minutes to obtain a 0.5 mil thickness of conversion in the intermediate polymer. In contrast with the same type of intermediate polymer disclosed in U.S. Pat. No. 3,784,399 to Grot, a contact time as high as 24 hours is disclosed with a minimum contact time with liquid ammonia of less than three hours. This 3-hour treatment would obtain a conversion of about 0.5 mil of the polymer. Additionally, extremely low temperatures must be employed with liquid ammonia with the resulting disadvantage of complicated techniques.

For reaction with ammonia a time period for reaction ranges upwards from several hours, while treatment with the primary amines to form the N-monosubstituted sulfonamido groups takes minutes. Flexibility is afforded with the amines to form the N-monosubstituted sulfonamido groups since the treatment techniques generally can involve liquid or gaseous contact. Also, with short periods of reaction a continuous process may be realized rather than batch conversion.

Due to the high electrical resistance of the N-sulfonamido groups in the film, these groups are further reacted with a base to the salt form. Highly desirable salts include those with alkali and alkaline earth metals with sodium and potassium preferred. In the case of alkali or alkaline earth salts of the N-monosubstituted sulfonamido groups, the salts may be represented by the formula $(-SO_2NR)_sT$ wherein R is as previously defined, T is an alkali or alkaline earth metal and $s$ is the valence of T.

As previously discussed, the thickness of the N-monosubstituted sulfonamido or salt layer is not considered critical but normally will be at least 200 angstroms in thickness and generally at least one micron. The thickness of the N-monosubstituted sulfonamido or salt layer will normally range from 0.01% to 80% of the film with 0.1 to 30% desirable with the use of the film in a chlor-alkali cell.

It is necessary for a second surface or layer of the film to contain the exchange sites in a form other than as N-monosubstituted sulfonamido or salt thereof. After formation of the N-monosubstituted sulfonamido layer or salt thereof, unreacted sulfonyl halide groups on a second film surface or layer are converted such as by hydrolysis to ionic form. In an alternate manner sulfonyl halide groups on one surface may be hydrolyzed prior to conversion of the sulfonyl halide groups on the other surface of the film to N-monosubstituted sulfonamido groups. The groups on the second film surface or layer will be present in ionic form when the film is employed in operation of an electrolytic cell.

The prior art techniques of conversion of the $-SO_2X$ groups with X as defined in a second layer of the film can be undertaken in accordance with known techniques such as U.S. Pat. No. 3,282,875 to Connolly et al., or U.S. Pat. No. 3,784,399 to Grot. Illustratively, the unconverted sulfonyl groups of the polymer may be converted to the form $-(SO_2NH)_mQ$ wherein Q is H, $NH_4$, cation of an alkali metal and/or cation of an alkaline earth metal and $m$ is the valence of Q. Additionally, the unconverted sulfonyl groups may be formed to $-(SO_3)_nMe$ wherein Me is a cation and $n$ is the valence of the cation. Preferred definitions of Q include $NH_4$ and/or cation of an alkaline metal particularly sodium or potassium. Preferred definitions of Me include potassium, sodium and hydrogen. As a practical matter in the second layer, at least a majority of the sulfonyl groups will be present as $-(SO_2NH)_mQ$ or $-(SO_3)_nMe$ as defined. Generally, all of the sulfonyl groups present as ion exchange sites will be in accordance with the above definition.

The ion exchange film is desirably of a thickness of the order of 0.002 to 0.02 inch. Excessive film thicknesses will aid in obtaining higher strength with the resulting deficiency of increased electrical resistance.

In many cases particularly where large areas of film are employed, it is desirable to reinforce the film to obtain additional strength. Suitable reinforcing materials include fluorinated resin fabrics such as polytetrafluoroethylene fabric, quartz fabric, glass mat and glass fabric. Encapsulation of the reinforcing material may be undertaken in a known manner, e.g. as in U.S. Pat. No. 3,770,567 to Grot.

Although the film of the present invention will be generally employed with the two layers of the ion exchange sites extending to the surface portions of the film, it is contemplated within this invention that the layers need not be exposed in actual operation of the film as a separator in an electrolytic cell. A coating could be applied to one or both surfaces of the film. This coating could either contain ion exchange sites or could be permeable to anolyte or catholyte.

The use of ion exchange films in a chlor-alkali cell is known as disclosed in German patent application No. 2,251,660, published Apr. 26, 1973 and Netherlands patent application No. 72.17598, published June 29, 1973. In a similar fashion as these teachings, a conventional chlor-alkali cell is employed with the critical distinction of the polymeric film in a housing separating the anode and cathode portions of the cell from which chlorine and caustic are respectively produced from brine flowing within the anode portion of the cell.

While the above description has been directed to use in a chlor-alkali cell, it is within the scope of this disclosure to produce alkali and alkaline earth metal hydroxide and halogen as chlorine from a solution of the alkali and alkaline earth metal salt. While efficiencies in current and power consumption differ, the operating conditions of the cell are similar to those disclosed in the German and Netherlands publications.

Utility for the disclosed film is to function for ion exchange. Therefore, general utility of the polymer film for ion exchange is directly contemplated. Illustratively, permeation selection of cations is directly encompassed. One method of determination of cation exchange properties is a measurement of permselectivity with separation of the same cations in solutions but at different concentrations. This involves cation transport and a permselectivity measurement of no voltage would indicate the polymer does not function for ion exchange.

To further illustrate the present invention, the following examples are provided.

EXAMPLE 1

In this and the following examples a film is employed of a copolymer of tetrafluoroethylene and

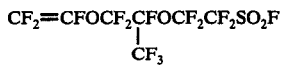

and is referred to as precursor polymer containing pendant sulfonyl fluoride groups. The equivalent weight of the polymer is given and illustratively at a mole ratio of tetrafluoroethylene to the other monomer of 7:1, an equivalent weight of 1146 would be obtained. Equivalent weight is the weight of the polymer in grams containing one equivalent of potention ion exchange capacity.

To a stoppered Erlenmeyer flask was added 50 cc. of a 40% aqueous solution of methylamine and the precursor fluorinated polymer containing pendant sulfonyl fluoride groups (EW 1151). Stirring took place at room temperature for 16 hours followed by washing with water. Infrared spectra by attenuated total reflectance (ATR) indicated the conversion of sulfonyl fluoride groups to $—SO_3^-$ and $—SO_2NHCH_3$.

EXAMPLE 2

In a similar procedure as Example 1, a 100 ml. round bottom flask was fitted with a magnetic stirrer and water cooled condenser topped by an $N_2$ bubbler. To the flask was added 50 mls of 40% aqueous methyl amine and the precursor fluorinated polymer containing pendant sulfonyl fluoride groups (EW 1151). Stirring took place at room temperature for 3 hours followed by washing with water and drying in a vacuum oven. Infrared (ATR) spectra indicated conversion of the sulfonyl fluoride groups to $—SO_3^-$ and mostly $—SO_2NHCH_3$ groups.

EXAMPLE 3

A 100 ml. round bottom flask was fitted with a gas inlet tube, magnetic stirrer and water cooled condenser topped by an $N_2$ bubbler. Into the flask was added 50 ml. of dimethylformamide into which was bubbled methylamine for one-half hour.

The precursor fluorinated polymer containing pendant sulfonyl fluoride groups (EW 1163) was added to the flask with stirring of the flask taking place at room temperature for one hour. The film was washed with water and dried. Infrared (ATR) spectra indicated the sulfonyl groups were converted to $—SO_2NHCH_3$.

EXAMPLE 4

A 200 ml. round bottom flask was fitted with a gas inlet tube, magnetic stirrer and water-cooled condenser topped by an $N_2$ bubbler. 100 ml. of dimethylsulfoxide (DMSO) were added. Anhydrous methylamine was bubbled into the DMSO until the bubble rate into the solvent equalled the bubble rate out.

Precursor fluorinated polymer containing pendant sulfonyl fluoride groups (EW 1163) was added with stirring for various time intervals to obtain varying penetration to obtain $—SO_2NHCH_3$ indicated by staining in accordance with the following Table.

| Duration of contact (minutes) | mil-$SO_2NHCH_3$ (average) |
|---|---|
| 1 | .1 |
| 3 | .5 |
| 5 | .9 |
| 7 | 1.3 |
| 9 | 1.7 |
| 11 | 1.8 |

EXAMPLE 5

The precursor fluorinated polymer containing pendant sulfonyl fluoride groups (EW 1198) in the form of a bag was treated with gaseous methylamine by inserting a tube into the bag. The bag was purged with $N_2$ followed by evacuation. Gaseous methylamine at about one atmosphere pressure was introduced and allowed to stand for 20 minutes. The bag was evacuated, purged with $N_2$ and washed with water. Staining indicated the sulfonyl fluoride groups had been converted to a depth of 1.7 mils with a sharp discrete layer of pendant $—SO_2F$ considered to be underneath.

EXAMPLE 6

Employing similar apparatus as in Example 1, 25 ml. of dimethylsulfoxide and 25 ml. of cyclohexylamine were added to a 100 ml. flask. Precursor fluorinated polymer containing pendant sulfonyl fluoride groups (EW 1163) was introduced into the flask which was stirred at 26° C. for 1 and 3 hours respectively.

The films were washed and dried followed by staining with Sevron® Red which indicated the respective films had surface layers of pendant groups in the form of $—SO_2NH—C_6H_{11}$, of 0.10 and 0.23 mil respectively.

EXAMPLE 7

Precursor fluorinated polymer containing pendant sulfonyl fluoride groups (EW 1063) was added to an evacuated 100 ml. flask. Ethylamine was added to give a pressure of one atmosphere and further additions made to keep the pressure at one atmosphere. After 30 minutes the flask was evacuated and the polymer film washed with water and dried. Infrared (ATR) spectra indicated the sulfonyl groups on the surface were converted to $—SO_2NHCH_2CH_3$. Staining with Sevron® Red showed the surface layer to be 1.7 mils in thickness.

EXAMPLE 8

Precursor fluorinated polymer containing pendant sulfonyl fluoride groups (EW 1163) was added to a flask containing 10 g. of 1,6-diaminohexane (hexamethylenediamine) and 40 g. of diethyleneglycoldimethyl ether. Stirring took place for one hour at 25° C. followed by washing with $H_2O$ and drying in a vacuum oven. Infrared (ATR) spectra indicated that the sulfonyl groups on the surface were all converted to substituted sulfonamido groups. Staining with Sevron ® Red showed the surface layer to be 0.21 mil in thickness.

EXAMPLE 9

Precursor fluorinated polymer containing pendant sulfonyl fluoride groups (EW 1163) was added to a flask containing 50 g. of 1,6-diaminohexane. Stirring took place for 1 hour at 60°-65° followed by washing with water and drying in a vacuum oven. Staining with Sevron ® Red showed a surface layer of 2.2 mil in thickness.

EXAMPLES 10 to 12

Following the general procedure of Example 1, separate pieces of blown film of 5 mils thickness as precursor fluorinated polymer containing pendant sulfonyl fluoride groups (EW 1150) were contacted on one surface respectively with liquid triethylene tetramine, aniline and liquid hydrazine (98% concentration). The contact times with triethylene tetramine and aniline were both 5 minutes while contact time with hydrazine was 7 minutes.

Thereafter all pieces of the film were hydrolyzed in a solution containing 15% sodium hydroxide and 30% dimethyl sulfoxide. Use of the triethylene tetramine and aniline samples in a permselectivity measurement on 3 N vs. 1 N KCl respectively gave 25.8 mV and 26.3mV.

For a separate permselectivity measurement, all samples after hydrolysis with the 15% sodium hydroxide, were converted to the $H^+$ form by contact with HCl followed by conversion to the $K^+$ form by boiling in potassium carbonate solution for 30 minutes. The original treated triethylene tetramine, aniline and hydrazine polymers respectively yield voltages of 18.7 mV, 19.6 mV and 19.7 mV.

EXAMPLE 13

A 5 mil film of precursor fluorinated polymer containing pendant sulfonyl fluoride groups (EW 1108) was placed in a Pyrex ® baking dish. Ethylenediamine (99% purity) was poured on top of the film so as to contact only the top surface. The surface of the liquid was covered with a second, similar film to minimize the exposure to moisture. After 15 minutes at room temperature, the amine was poured off, the film rinsed first with diglyme, then benzene and finally with warm water at about 40° C. Staining of a cross section of the film with Sevron ® Red indicated a reaction to a depth of 0.7 mil.

The remaining pendant sulfonyl fluoride groups were converted to $-SO_3K$ groups by immersing the film in a solution of 15% potassium hydroxide and 30% dimethyl sulfoxide in water for 6 hours at 60° C.

The film was clamped in a chlor-alkali cell with the amine treated side toward the cathode. The chlor-alkali electrolysis cell was constructed of two identical half-cell housings made from Teflon ® TFE resin into which were mounted in the respective cell housings a dimensionally stable anode and a perforated stainless steel cathode. The clamped film gave an active area of the electrodes and membrane of 4 × 4 inches. The electrolytes saturated brine and sodium hydroxide were circulated through respective cell halves with a temperature maintained at 85° C. by heaters installed in the circulatory lines. Fresh brine was pumped into the anode section of the cell and distilled water was pumped into the cathode section of the cell.

In operation of the cell a current efficiency of 91% was realized at a cell voltage of 3.6 volts. A sodium hydroxide concentration of 14% was obtained.

EXAMPLE 14

Using the procedure described in Example 5, one surface of a 6.6 mil precursor fluorinated polymer film of an EW of 1198 was converted to a depth of 1.7 mils to the N-methyl sulfonamide form. After conversion of the remaining $-SO_2F$ groups to the $-SO_3K$ form the film was tested in a chlor-alkaki cell as described in Example 13. A current efficiency of 86% at a cell voltage of 3.8 volts and a sodium hydroxide concentration of 12% was obtained.

EXAMPLE 15

A 5 mil thick precursor fluorinated polymer film of an EW of 1200 was completely converted to the N-methyl sulfonamide form by treating with gaseous methylamine for 6 hours.

When tested in a chlor-alkali cell as described in Example 13, a current efficiency of 89% at a cell voltage of 4.5 volts and a sodium hydroxide concentration of 14% was obtained.

EXAMPLE 16

A. In a similar procedure as Example 13, a 7-mil film was prepared of 1200 equivalent weight polymer (composition set foth in Example 1) in which ethylenediamine was reacted to a depth of 0.9 mils with pendant sulfonyl fluoride groups in the polymer. The pendant sulfonyl fluoride groups in the remaining thickness of the film were converted to $-SO_3K$.

The film was clamped in a chlor-alkali cell made of a glass anolyte compartment and a polymethyl methacrylate catholyte compartment with the amine treated side facing the cathode. The film employed in the cell was 3 inches in diameter. The cell was operated at a total current of 14 amps (2 amps/$in^2$) and at a temperature of 80° C. ± 2°. The sodium chloride concentration to the anode compartment was 15–20%.

The following results were obtained.

| | Day | Caustic Normality | Voltage(V) | Efficiency % |
|---|---|---|---|---|
| Film - 7-mil 1200 Equiv. Wt. treated to a depth of 0.9 mils with ethylene diamine | 1 | 12.3 | 5.1 | 86.9 |
| | 2 | 12.0 | 5.2 | 85.5 |
| | 3 | 11.6 | 5.1 | 82.7 |
| | 4 | 11.6 | 5.0 | 82.2 |
| | 5 | 11.6 | 4.8 | 78.2 |
| | 6 | 11.7 | 4.8 | 75.1 |
| | 7 | 11.8 | 4.8 | 73.0 |
| | 8 | 11.6 | 4.7 | 75.6 |

B. The procedure of part A. was repeated except the film was reacted to a depth of 1.2 mils with ethylene diamine and was reinforced by lamination with T-900

Teflon ® polytetrafluoroethylene cloth (made by Stern and and Stern Textiles). The results are as follows:

|  | Day | Caustic Normality | Voltage(V) | Efficiency % |
|---|---|---|---|---|
| Laminate 7-mil 1200 Equivalent Weight reinforced with Teflon ® cloth treated to a depth of 1.2 mils with ethylene diamine | 1 | 10.3 | 4.8 | 86.9 |
|  | 2 | 10.6 | 5.0 | 85.4 |
|  | 3 | 10.2 | 5.0 | 84.3 |
|  | 4 | 10.7 | 5.1 | 82.7 |
|  | 5 | 10.5 | 5.0 | 78.5 |
|  | 6 | 10.0 | 5.0 | 78.1 |

EXAMPLE 17

A. The procedure of Example 16 A. was followed except for use of n-butylamine in place of ethylene diamine and for use of a glass cathode compartment in place of a polymethyl methacrylate cathode compartment in the cell. The results are as follows:

|  | Day | Caustic Normality | Voltage(V) | Efficiency % |
|---|---|---|---|---|
| Film 7-mil 1200 Equivalent Weight treated to a depth of 0.9 mils with n-butylamine | 1 | 10.9 | 4.7–4.8* | 94.9 |
|  | 2 | 11.0 | 4.9–5.0* | 96.5 |
|  | 3 | 10.6 | 4.9–5.1* | 93.8 |
|  | 4 | 10.8 | 5.0–5.1* | 90.7 |
|  | 5 | 10.9 | 5.1* | 88.8 |
|  | 6 | 10.9 | 5.0–5.2* | 91.7 |

*glass cathode compartment; cell voltage usually runs about 0.5 volts higher than in polymethyl methacrylate cathode compartment B. The procedure of Example 16 B. was followed except for use of n-butylamine in place of ethylene diamine. The results are as follows:

|  | Day | Caustic Normality | Voltage (V) | Efficiency % |
|---|---|---|---|---|
| Laminate 7-mil 1200 Equivalent Weight reinforced with Teflon ® cloth treated to a depth of 1.3 mils with n-butylamine | 1 | 11.7 | 4.2–4.3 | 93.2 |
|  | 2 | 11.5 | 4.3 | 92.2 |
|  | 3 | 11.7 | 4.2–4.4 | 93.4 |
|  | 4 | 11.4 | 4.3 | 90.6 |

EXAMPLE 18

In a similar procedure as Example 16, a 7-mil film was prepared of 1200 equivalent weight (composition set forth in Example 13) in which 2-methoxyethylamine was reacted to a depth of 0.9 mil with pendant sulfonyl fluoride groups in the polymer. The pendant sulfonyl fluoride groups in the remaining thickness of the film were converted to —SO₃K. The film was then tested in a chlor-alkali cell described in Example 17 A. The results are as follows:

|  | Day | Caustic Normality | Voltage(V) | Efficiency % |
|---|---|---|---|---|
| Film, 7-mil 1200 Equivalent Weight, treated to a depth of 0.9 mil with 2 methoxy-ethylamine | 1 | 10.9 | 4.8* | 94.9 |
|  | 2 | 11.0 | 5.0* | 96.5 |
|  | 3 | 10.7 | 5.0* | 93.8 |
|  | 4 | 10.8 | 5.1* | 90.7 |
|  | 5 | 10.9 | 5.1* | 88.8 |
|  | 6 | 10.9 | 5.2* | 91.7 |

* glass cathode compartment; cell voltage usually run about 0.5 volts higher than in polymethyl methacrylate compartment

Comparative Example

A. & B. The procedure of Example 16 A. was followed for two separate films except for the use of gaseous ammonia in place of the amine to react with pendant sulfonyl groups to a stated depth in the polymer film. The results are as follows:

|  | Day | Caustic Normality | Voltage(V) | Efficiency % |
|---|---|---|---|---|
| Film 7-mil 1200 Equivalent Weight treated to a depth of 0.7 mils with ammonia | 1 | 10.4 | 3.9–4.0 | 65.5 |
|  | 2 | 10.3 | 3.8–3.9 | 66.2 |
|  | 3 | 10.3 | 3.8–3.9 | 65.1 |

|  | Day | Caustic Normality | Voltage(V) | Efficiency % |
|---|---|---|---|---|
| Film 7-mil 1200 Equivalent Weight treated to a depth of 1.1 mils with ammonai | 1 | 9.1 | 3.8 | 61.7 |
|  | 2 | 8.6 | 3.8 | 63.3 |
|  | 3 | 8.7 | 3.8 | 63.5 |

C. The procedure of Example 16 B. was followed except for use of gaseous ammonia in place of the amine to react with pendant sulfonyl fluoride groups to a stated depth in the polymer film. The results are as follows:

|  | Day | Caustic Normality | Voltage(V) | Efficiency % |
|---|---|---|---|---|
| Laminate 7-mil 1200 Equivalent Weight reinforced with Teflon ® cloth treated to a depth of 1.1 mils with ammonia | 1 | 9.5 | 4.1–4.2 | 64.2 |
|  | 2 | 9.1 | 4.1–4.2 | 65.2 |
|  | 3 | 9.0 | 4.1–4.2 | 64.2 |

Note to Comparative Example B.

As to another sample of the film 7-mil 1200 equivalent weight treated to a depth of 1.1 mils with ammonia and tested in the chlor-alkali cell at a lower caustic normality, the following data were obtained:

|  | Day | Caustic Normality | Voltage(V) | Efficiency % |
|---|---|---|---|---|
| Film, 7 mil 1200 Equivalent Weight, treated to a depth of 1.1 mils with ammonia | 2 | 5.8 | 3.8 | 65.4 |
|  | 3 | 5.8 | 4.3 | 67.5 |
|  | 6 | 5.5 | 3.8 | 66.6 |
|  | 8 | 5.5 | 4.2 | 68.9 |

| | | | |
|---|---|---|---|
| | 10 | 5.1 | 4.1 | 66.4 |

After about 60 days continued testing, the efficiency gradually increased to the following levels.

| Day | Caustic Normality | Voltage(V) | Efficiency % |
|---|---|---|---|
| 64 | 7.4 | 5.0 | 75.0 |
| 66 | 7.4 | 4.9 | 76.9 |
| 69 | 7.5 | 4.9 | 72.9 |
| 71 | 7.8 | 5.0 | 75.4 |
| 73 | 8.9 | 5.0 | 70.5 |

What is claimed is:

1. A film comprising a fluorine-containing polymer containing pendant side chains with sulfonyl groups attached to a carbon atom having at least one fluorine atom connected thereto, at least 40% of the sulfonyl groups in a first layer of said film in a thickness of at least 200 angstroms present as ion exchange sites as N-monosubstituted sulfonamido groups or salt thereof formed through reaction of $-SO_2X$ groups, where X is fluorine or chlorine, with a primary amine, and a second layer of said film having at least a majority of the sulfonyl groups present as ion exchange sites as $-(SO_2NH)_mQ$ or $-(SO_3)_nMe$ wherein Q is selected from the group consisting of H, $NH_4$, cation of an alkali metal, cation of an alkaline earth metal and combinations thereof, $m$ is the valence of Q, Me is a cation and $n$ the valence of the cation, and the amine is a diamine of the formula $NH_2(CH_2)_pNH_2$ with $p$ an integer from 2 to 10, methyl amine, ethyl amine, butylamine, 2-methoxyethylamine or cyclohexylamine.

2. The film of claim 1 wherein said sulfonyl groups in the second layer are present in ionic form.

3. The film of claim 2 wherein at least a majority of the sulfonyl groups in the second layer are present as $-(SO_2NH)_mQ$ or $-(SO_3)_nMe$ wherein Q is selected from the group consisting of $NH_4$, cation of an alkali metal, cation of an alkaline earth metal and combinations thereof, $m$ is the valence of Q, Me is a cation and $n$ the valence of th cation.

4. The film of claim 2 wherein said first and second layers extend from surfaces of said film.

5. The film of claim 1 wherein said first and second layers extend from surfaces of said film.

6. The film of claim 1 wherein the thickness of the first layer is at least one micron.

7. The film of claim 1 wherein the first layer is present to a depth of 0.1 to 30% of the thickness of the film.

8. The film of claim 7 with a thickness of 0.002 to 0.02 inches.

9. The film of claim 1 wherein the salt of the N-monosubstituted sulfonamido groups is present.

10. The film of claim 9 wherein an alkali or alkaline earth salt of the N-monosubstituted sulfonamido groups is present.

11. The film of claim 8 wherein at least 90% of the sulfonyl groups in the first layer are present as N-monosubstituted sulfonamido groups or salt thereof.

12. The film of claim 8 wherein at least 99% of the sulfonyl groups in the first layer are present as N-monosubstituted sulfonamido groups or salt thereof.

13. The film of claim 1 wherein the amine is a difunctional amine.

14. The film of claim 1 wherein the amine is ethylene diamine.

15. The film of claim 1 wherein sulfonyl groups in the second layer are presented as $-SO_3Na$ or $-SO_3K$.

16. The film of claim 1 wherein said fluorinecontaining polymer is perfluorinated.

17. The film of claim 16 wherein said fluorinecontaining polymer is a copolymer of tetrafluoroethylene and perfluoro(3,6-dioxa-4-methyl-7-octenesulfonyl fluoride).

18. The film of claim 1 wherein the amine is butylamine.

19. The film of claim 1 wherein the amine is 2-methoxyethylamine.

* * * * *

UNITED STATES PATENT OFFICE
CERTIFICATE OF CORRECTION

PATENT NO. : 4,085,071
DATED : April 18, 1978
INVENTOR(S) : Paul Raphael Resnick & Walther Gustav Grot It is certified that error appears in the above-identified patent and that said Letters Patent are hereby corrected as shown below:

Column 7, line 20, "with", first occurrence only, should read --within--.

Column 12, line 20, "chlor-alkaki" should read --chlor-alkali--.

Signed and Sealed this

Twenty-second Day of May 1979

[SEAL]

Attest:

RUTH C. MASON
Attesting Officer

DONALD W. BANNER
Commissioner of Patents and Trademarks